United States Patent
Okubo

(10) Patent No.: US 6,804,999 B2
(45) Date of Patent: Oct. 19, 2004

(54) TIRE CONDITION MONITORING APPARATUS

(75) Inventor: Youichi Okubo, Ogaki (JP)

(73) Assignee: Pacific Industrial Co., Ltd., Ogaki (JP)

( * ) Notice: Subject to any disclaimer, the term of this patent is extended or adjusted under 35 U.S.C. 154(b) by 0 days.

(21) Appl. No.: 10/327,406

(22) Filed: Dec. 20, 2002

(65) Prior Publication Data

US 2003/0121320 A1 Jul. 3, 2003

(30) Foreign Application Priority Data

Dec. 20, 2001 (JP) ........................................ 2001-387712
Jan. 18, 2002 (JP) ........................................ 2002-009919

(51) Int. Cl.$^7$ ............................................. G01M 17/02
(52) U.S. Cl. ....................................... 73/146; 73/146.5
(58) Field of Search ................................ 73/146–146.8; 340/442–444

(56) References Cited

U.S. PATENT DOCUMENTS

| | | | |
|---|---|---|---|
| 5,602,524 A | 2/1997 | Mock et al. | |
| 5,880,363 A | 3/1999 | Meyer et al. | |
| 6,062,072 A | * | 5/2000 | Mock et al. ................ 73/146.5 |

FOREIGN PATENT DOCUMENTS

| | | |
|---|---|---|
| DE | 196 32 150 A1 | 2/1998 |
| EP | 1 026 015 A2 | 8/2000 |
| EP | 1 092 568 A2 | 4/2001 |
| JP | 2000-153703 A | 6/2000 |

* cited by examiner

*Primary Examiner*—Edward Lefkowitz
*Assistant Examiner*—Jermaine Jenkins
(74) *Attorney, Agent, or Firm*—Crompton, Seager & Tufte, LLC

(57) ABSTRACT

A specific ID code of a transmitter 3 is registered in a receiver 4 in the following procedure. A commander 5, which is connected to the receiver 4 with a cable 6, is located close to the corresponding transmitter 3. An operation switch 7 of the commander 5 is then depressed. The commander 5 transmits an instruction signal to the transmitter 3 and the turned-on state of the operation switch 7 is conveyed to the receiver 4 via the cable 6. The transmitter 3 wirelessly transmits a response signal including the ID code in response to the instruction signal. On the other hand, upon receiving the response signal from the transmitter while the commander 5 is conveying the turned-on state of the operation switch 7, the receiver 4 stores the ID code in the received response signal. Therefore, the ID code of each transmitter is easily registered in the receiver 4.

6 Claims, 2 Drawing Sheets

TIRE CONDITION MONITORING APPARATUS

BACKGROUND OF THE INVENTION

The present invention relates to a tire condition monitoring apparatus for monitoring the condition of the tires of a vehicle and permitting a driver in a passenger compartment to monitor the tire condition, and more particularly, to a structure for registering identification data of a transmitter in a receiver.

Conventionally, a wireless type tire condition monitoring apparatus has been used for permitting a driver in the passenger compartment to monitor the condition of the tires. The apparatus includes transmitters, each of which is associated with a different one of the tires and is attached to a wheel of the tire, and a receiver mounted in the body frame of the vehicle Each of the transmitters detects the condition of the associated tire, such as the tire pressure and the interior temperature of the tire, and wirelessly transmits a signal including data that indicates the detection results to the receiver. On receiving the signal, the receiver displays the condition of the tire on a display, which is located, for example, in the passenger compartment.

A specific identification data (ID code) is given to each of the transmitters. Each transmitter transmits signals that include data of the tire condition and the given ID code. On the other hand, the ID codes of all the transmitters associated with the vehicle to which the receiver is mounted are registered in the receiver. When the ID code included in the received signal matches with one of the registered ID codes, the receiver continues processing the received signal. However, if the ID code included in the received signal differs from any of the registered ID codes, the receiver does not process the received signal. Therefore, the receiver is prevented from processing signals from a transmitter that is not associated with the vehicle to which the receiver in mounted.

Japanese Laid-Open Patent Publication No. 2000-153703 discloses a structure for registering an ID code or a transmitter in the receiver. According to the above publication, when registering the ID code of the transmitter to the receiver, the operation mode of the receiver is switched from a monitoring mode for monitoring the tire condition to a registration mode for registering the ID code. In this state, a control tool is located close to one of the transmitters and an instruction signal is sent to the transmitter from the control tool. Then, in response to the instruction signal, the transmitter sends a signal including data of the tire condition and the ID code. When the receiver that is in the registration mode receives the signal from the transmitter, the receiver registers (stores) the ID code included in the signal. Therefore, by transmitting signals from all the transmitters on the vehicle using the control tool, the ID codes of all the transmitters are registered in the receiver. After registering the ID codes, the operation mode of the receiver is switched back to the monitoring mode.

However, according to the structure of the above publication, when registering the ID code of the transmitter to the receiver, the operation mode of the receiver need to be switched manually, and the control tool need to be manipulated to permit the transmitter to transmit a signal Thus, registering the ID codes to the receiver is troublesome.

SUMMARY OF THE INVENTION

The objective of the present invention is to provide a tire condition monitoring apparatus that easily registers identification data of a transmitter to a receiver.

To achieve the above objective, the present invention provides an apparatus for monitoring the condition of a tire mounted to a vehicle The apparatus includes a commander, a transmitter, and a receiver. The commander includes an operation switch and transmits an instruction signal when the operation switch is turned-on. The transmitter is attached to the tire. The transmitter includes a tire condition sensor, which detects the condition of the tire, a receiving portion, which receives the instruction signal, and a transmitting portion, which transmits a response signal upon receiving the instruction signal. The response signal includes a specific identification data given to the transmitter in advance. The receiver is located in the body of the vehicle. The receiver includes a receiving portion, which receives a signal transmitted from the transmitter, and a rewritable ID memory, which stores the identification data of the transmitter. When the operation switch is turned-on, the commander conveys the turned-on state of the operation switch to the receiver. When receiving the response signal while the commander is conveying the turned-on state of the operation switch to the receiver, the receiver stores the identification data in the response signal in the ID memory.

The present invention also provides an apparatus for monitoring the condition of a tire mounted to a vehicle. The apparatus includes a commander, a transmitter, and a receiver. The commander includes an operation switch and transmits an instruction signal when the operation switch is turned-on. The transmitter is attached to the tire. The transmitter includes a tire condition sensor, which detects the condition of the tire, a receiving portion, which receives the instruction signal, and a transmitting portion, which transmits a response signal upon receiving the instruction signal. The response signal includes a specific identification data given to the transmitter in advance. The receiver is located in the body of the vehicle. The receiver includes a receiving portion, which receives a signal transmitted from the transmitter, and a rewritable ID memory, which stores the identification data of the transmitter. The commander includes a receiving portion, which receives the response signal from the transmitter. When receiving the response signal, the commander sends the identification data in the response signal to the receiver. When receiving the identification data sent from the commander, the receiver stores the identification data in the ID memory.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
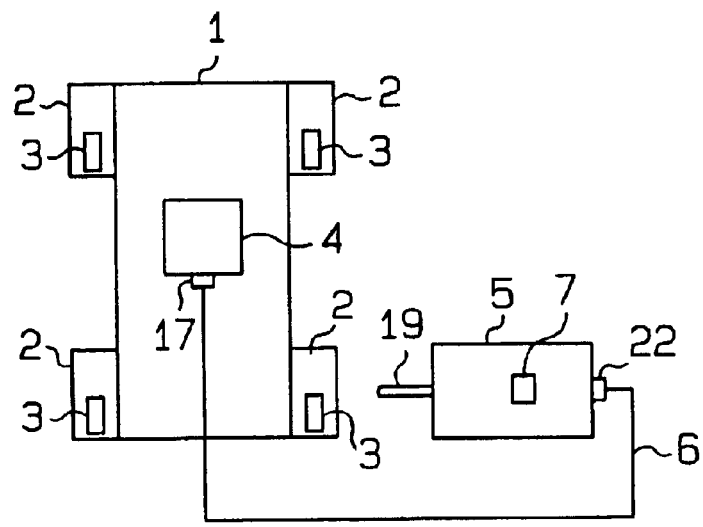
FIG. 1 is a schematic diagram illustrating a tire condition monitoring apparatus according to a first embodiment of the present invention.

A first embodiment of the present invention will now be described with reference to FIGS. 1 to 4. FIG. 1 shows a tire condition monitoring apparatus. The apparatus includes four transmitters 3, a receiver 4, and a commander 5. Each transmitter 3 is installed in an associated wheel 2 of a vehicle 1. The receiver 4 is located in the body of the vehicle 1. The commander 5 instructs each transmitter 3 to transmit a signal including identification data (an ID code). Each transmitter 3 is fixed to the wheel 2 to which the associated tire is attached such that the transmitter 3 is located in the interior of the tire. Each transmitter 3 detects the condition of the associated tire, such as the tire pressure, and wirelessly transmits a signal including data that indicates the detected tire pressure. The receiver 4 receives the signal wirelessly transmitted by each transmitter 3 and processes the received signal.

Figure 2:
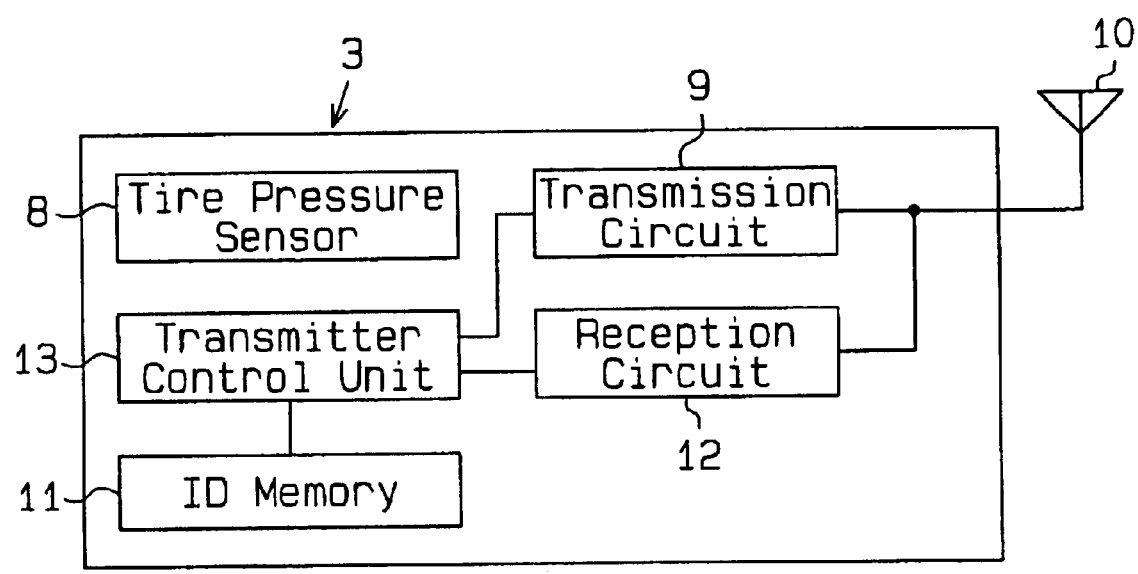
FIG. 2 is a block diagram illustrating a transmitter of the tire condition monitoring apparatus of FIG. 1.

With reference to FIG. 2, each transmitter 3 has a transmitter control unit 13, which is, for example, a microcomputer. A controller, which is the transmitter control unit 13 in the first embodiment, includes, for example, a central processing unit (CPU), a random access memory (RAM), and a read only memory (ROM). The transmitter control unit 13 controls the entire operation of the transmitters 3. Each transmitter 3 further includes a tire condition sensor, which is a tire pressure sensor 8 in the first embodiment, a transmitting portion, which is a transmission circuit 9 in the first embodiment, an antenna 10, an ID memory 11 that stores a specific ID code, and a receiving portion, which is a reception circuit 12 in the first embodiment. The ID codes are identification information specific to each of the transmitters 3 and are used to permit the receiver 4 to identify each of the four transmitters 3 installed in, or associated with, the vehicle 1.

The tire pressure sensor 8 measures the pressure in the interior of the associated tire and provides the transmitter control unit 13 with pressure data, which is obtained from the measurement. The transmitter control unit 13 sends data including the pressure data and the ID code stored in the ID memory 11 to the transmission circuit 9. The transmission circuit 9 encodes and modulates the data sent from the transmitter control unit 13. The transmission circuit 9 then wirelessly sends a signal including the data by the antenna 10.

The transmitter control unit 13 of each transmitter 3 controls the pressure sensor 8 to perform measurement at predetermined time intervals (for example, every 15 seconds). Also, the transmitter control unit 13 controls the transmission circuit 9 to perform periodical transmission every time the pressure sensor 8 completes a predetermined number of (for example, 40 cycles of) measurements (a periodical transmission mode). However, when acknowledging an abnormality of the pressure of the associated tire (such as rapid change or decrease of pressure), the transmitter control unit 13 causes the transmission circuit 9 to transmit data immediately regardless of the periodical transmission (an abnormality transmission mode). The structure of a signal transmitted from each transmitter 3 in the abnormality transmission mode may differ from the structure of a signal transmitted from each transmitter 3 in the periodical transmission mode. In the first embodiment, the structures of the signals are the same.

Each transmitter 3 has a battery (not shown), which powers the transmitter 3. Although not shown in the drawings, each transmitter 3 may further include a temperature sensor as the tire condition sensor. The data indicating the detected temperature in the interior of the tire is included in the signal sent from the transmitter 3.

The reception circuit 12 receives an external signal, or the instruction signal from the commander 5, by the antenna 10. When receiving the instruction signal from the commander 5 via the reception circuit 12, the transmitter control unit 13 wirelessly transmits a response signal to the transmission circuit 9 via the antenna 10 (a forced transmission mode). The response signal may have any structure an long as the signal includes at least the ID code of the associated transmitter 3. In the first embodiment, the signal has the structure that is the same as that of the transmission signals according to the periodical transmission mode and the abnormality transmission mode.

The forced transmission mode corresponds to a first transmission mode, in which a response signal is transmitted corresponding to the instruction signal from the commander 5. The periodical transmission mode and the abnormality transmission mode correspond to a second transmission mode, in which signals are transmitted regardless of the instruction signal from the commander 5.

Each transmitter 3 includes a valve stem (not shown) for introducing air into the interior of the tire. Each valve stem projects outside the associated tire through the corresponding wheel 2 and can also be used as the antenna 10.

Figure 3:
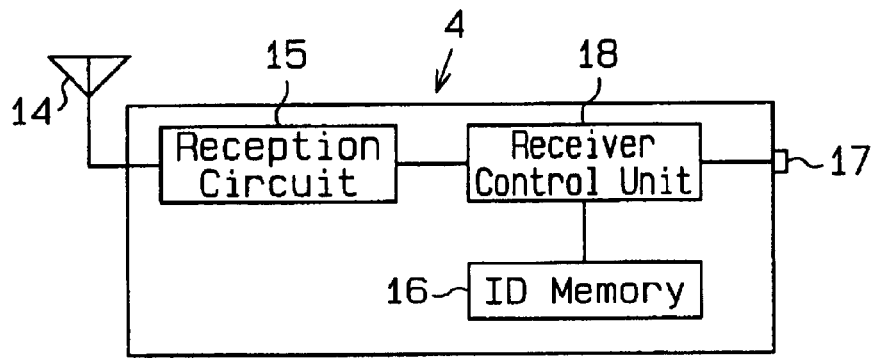
FIG. 3 is a block diagram illustrating a receiver of the tire monitoring apparatus of FIG. 1.

The receiver 4, which is shown in FIG. 3, is powered by a battery (not shown) installed in the vehicle 1. The receiver 4 includes a receiver control unit 18, which is, for example, a microcomputer. A controller, which is the receiver control unit 18 in the first embodiment, includes, for example, a CPU, an RAM, and an ROM. The receiver control unit 18 controls the entire operation of the receiver 4. The receiver 4 further includes at least one reception antenna 14, a receiving portion, which is a reception circuit 15 in the first embodiment, a rewritable ID memory 16 for storing the ID code of the four transmitters 3 installed in the vehicle 1, and a commander connecting terminal 17.

The reception circuit 15 receives a transmission signal from each transmitter 3 via the reception antenna 14. The reception circuit 15 demodulates and decodes the received signal to obtain data, which is then transmitted to the receiver control unit 18. The receiver control unit 18 obtains the pressure in the interior of the tire associated with the source transmitter 3 based on the data from the reception circuit 15. The receiver control unit 18 indicates the information concerning the tire pressure on a display (not shown), which is connected to the receiver 4. The display is located in the passenger compartment so that the occupants of the vehicle 1 can see the information shown on the display. The abnormality of the tire pressure may be informed by the display or an alarm separately provided from the display.

Figure 4:
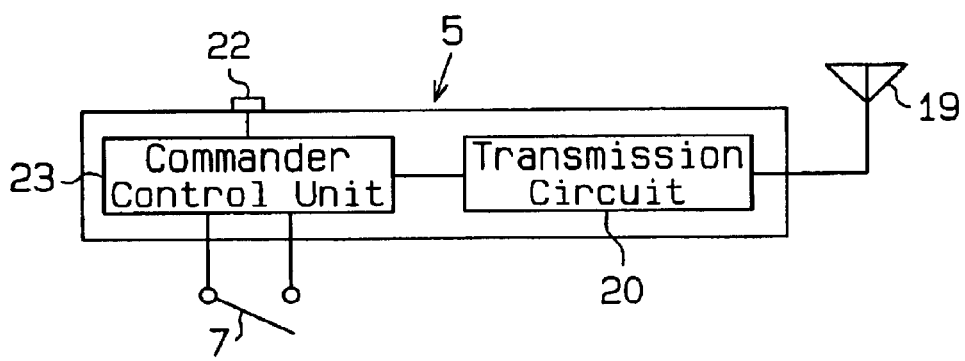
FIG. 4 is a block diagram illustrating a commander of the tire condition monitoring apparatus of FIG. 1.

As shown in FIG. 4, the portable commander (control tool) 5 includes a commander control unit 23, which is, for example, a microcomputer. A controller, which is the commander control unit 23 in the first embodiment, includes, for example, a CPU, an RAM, and an ROM. The commander control unit 23 controls the entire operation of the commander 5. The commander 5 further includes an antenna 19, a transmitter, which is a transmission circuit 20 in the first embodiment, an operation switch 7, which in manually operated to transmit an instruction signal to the transmitter 3, a receiver connecting terminal 22. The operation switch 7 is, for example, a push-button.

A cable 6 electrically connects the receiver connecting terminal 22 of the commander 5 to the commander connecting terminal 17 of the receiver 4 (see FIG. 1) The cable 6 is detachable from each connecting terminal 17, 22.

The specific ID code of each transmitter 3 is registered in the receiver 4 as follows. First, the commander 5 is connected to the receiver 4 with the cable 6 as shown in FIG. 1. In this state, the antenna 19 of the commander 5 is placed close to the antenna 10 of a corresponding transmitter 3. The operation switch 7 of the commander 5 is then depressed. The commander control unit 23 transmits an instruction signal to the corresponding transmitter 3 via the transmission circuit 20 and the antenna 19, and sends a signal (ON signal) that indicates the turned-on state of the operation switch 7 to the receiver control unit 18 of the receiver 4 via the cable 6. The ON signal is sent to the receiver 4 only while the operation switch 7 is depressed. The radio field intensity of the instruction signal sent from the commander 5 is relatively weak. Therefore, the transmitters 3 other than the transmitter 3 located close to the antenna 19 of the commander 5 do not receive the instruction signal.

On receiving the instruction signal via the antenna 10 and the reception circuit 12, the transmitter control unit 13 wirelessly transmits a response signal including the ID code stored in the ID memory 11 in response to the instruction signal. When the receiver control unit 18 receives the response signal via the reception antenna 14 and the reception circuit 15 in a state, in which the ON signal is sent through the cable 6, the receiver control unit 18 registers the ID code included in the response signal in the ID memory 16.

The above operation is repeated for all four transmitters 3 installed in the vehicle 1. The receiver 4 thus registers the ID codes of the transmitters 3.

The receiver 4 is switched to a registration mode (a first operation mode) for permitting registration of the ID code only when the commander 5 is conveying the turned-on state of the operation switch 7. The receiver 4 operates in a monitoring mode (a second operation mode) for monitoring the tire condition when the commander 5 is not conveying the turned-on state of the operation switch 7. In the monitoring mode, on receiving a signal from the transmitter 3, the receiver control unit 18 of the receiver 4 compares the ID code included in the signal with the ID codes stored in the ID memory 16. When the ID code in the received signal matches with one of the ID codes in the ID memory 16, the receiver control unit 18 continues processing the received signal. That is, the receiver control unit 18 retrieves information such as the pressure data from the received signal and indicates the information concerning the tire condition on the display located in the passenger compartment as required The first embodiment provides the following advantages.

The ID code of each transmitter 3 is registered in the receiver 4 by only manipulating the operation switch 7 of the commander 5, which is connected to the receiver 4. Thus, as compared to the conventional structure, the operation for switching the receiver 4 into the registration mode and the operation for causing the transmitters 3 to transmit the response signal need not be performed separately This facilitates the registering procedure of the ID codes of the transmitters 3 in the receiver 4.

The receiver 4 is switched to the registration mode only when the operation switch 7 is depressed. Each transmitter 3 transmits a response signal in response to the instruction signal sent in accordance with manipulation of the operation switch 7. Therefore, the transmission of the ID code from the desired transmitter 3 and the registration of the transmitted ID code in the receiver 4 are both performed by the manipulation of the commander 5. Therefore, the ID code of only the desired transmitter 3 is easily and reliably registered in the receiver 4, and the ID code is prevented from being registered in the receiver 4 mistakenly.

A second embodiment of the present invention will now be described with reference to FIG. 5. The differences from the first embodiment of FIGS. 1 to 4 will mainly be discussed below. The structure of the commander 5 according to the second embodiment differs from that of the first embodiment. The structures of the transmitters 3 and the receiver 4 are the same as those of the first embodiment. Therefore, the second embodiment is described with reference to FIGS. 1 to 3 as required.

Figure 5:
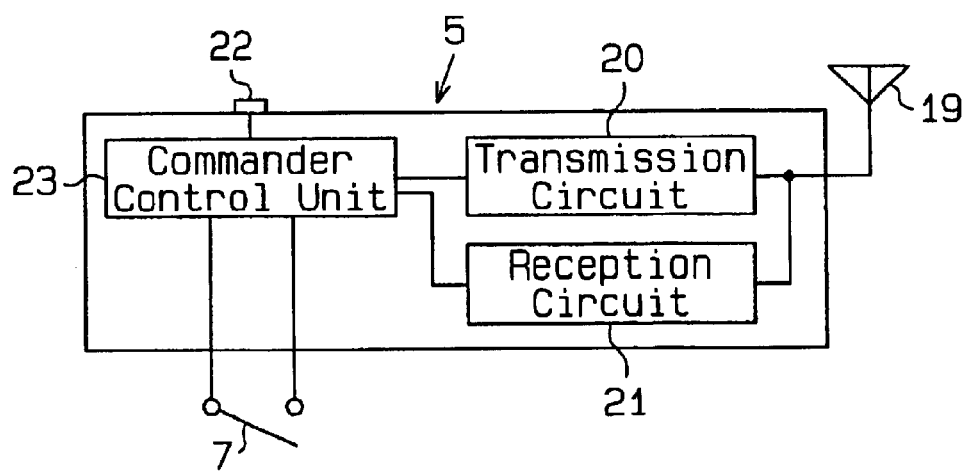
FIG. 5 is a block diagram illustrating a commander according to a second embodiment of the present invention.

As shown in FIG. 5, the commander 5 of the second embodiment includes the antenna 19, the transmission circuit 20, the operation switch 7, the receiver connecting terminal 22, and the commander control unit 23, which have the same structures as those of the commander 5 shown in FIG. 4. In addition, the commander 5 of the second embodiment includes a receiving portion, which is a reception circuit 21. The reception circuit 21 receives transmission signals from each transmitter 3.

The specific ID code of each transmitter 3 is registered in the receiver 4 as follows. First, the commander 5 is connected to the receiver 4 with the cable 6 as shown in FIG. 1. In this state, the antenna 19 of the commander 5 is placed close to the antenna 10 of a corresponding transmitter 3. The operation switch 7 of the commander 5 is then depressed. The commander control unit 23 transmits an instruction signal to the corresponding transmitter 3 via the transmission circuit 20 and the antenna 19.

On receiving the instruction signal via the antenna 10 and the reception circuit 12, the transmitter control unit 13 wirelessly transmits a response signal including the ID code stored in the ID memory 11 in response to the instruction signal. The commander control unit 23 receives the response signal via the antenna 19 and the reception circuit 21.

The commander control unit 23 transfers the ID code in the received response signal to the receiver control unit 18 via the receiver connecting terminal 22, the cable 6, and the commander connecting terminal 17. Then, the receiver control unit 18 registers the transferred ID code to the ID memory 16.

The receiver 4 performs registering operation of the ID code transferred via the cable 6 while maintaining the monitoring mode described in the first embodiment. That is, when the transmitter 3 transmits a response signal in response to the instruction signal sent from the commander 5, the response signal in received by not only the commander 5 but also the receiver 4 via the reception antenna 14. At this time, if the commander 5 is not connected to the receiver 4 with the cable 6, the receiver 4 treats the received response signal in the same manner as the signals according to the periodical transmission mode or the signals according to the abnormality transmission mode. That is, when the ID code in the response signal matches with one of the ID codes in the ID memory 16, the receiver 4 retrieves necessary information, such as pressure data, from the response signal. In this case, the receiver 4 does nor register the ID code in the wirelessly received response signal to the ID memory 16.

When receiving the response signal via the reception antenna 14 in a state, in which the receiver 4 is connected to the commander 5 with the cable 6, the receiver 4 performs the operation according to the monitoring mode in the same manner as when the receiver 4 is not connected to the commander 5. However, the receiver 4 performs the operation for registering the ID code transferred from the commander 5 via the cable 6 in parallel with the operation according to the monitoring mode.

The second embodiment provides the advantages of the first embodiment shown in FIGS. 1 to 4. In the second embodiment, the receiver 4 registers only the ID code transferred from the commander 5 via the cable 6. Thus, the receiver 4 further prevents the ID code from being registered in the receiver 4 mistakenly.

It should be apparent to those skilled in the art that the present invention may be embodied in many other specific forms without departing from the spirit or scope of the invention. Particularly, it should be understood that the invention may be embodied in the following forms.

In the first embodiment, the commander 5 need not be connected to the receiver 4 with the cable 6. Instead, radio communication may be established between the receiver 4 and the commander 5. That is, the commander 5 need not be wired to the receiver 4. Instead, the commander 5 may be wirelessly connected to the receiver 4. In this case, the commander 5 wirelessly transmits an ON signal to the receiver 4 based on the manipulation of the operation switch 7. The structure of the ON signal may be the same as or different from that of the instruction signal sent to the transmitter 3. The commander 5 transmits the ON signal via the antenna 19, or an antenna (not shown) separately arranged from the antenna 19. On the other hand, the receiver 4 receives the ON signal from the commander via the reception antenna 14, or an antenna (not shown) separately arranged from the antenna 14. According to this modification, the terminals 22, 17 are omitted from the commander 5 and the receiver 4.

In the second embodiment, in the same manner as the above modification, the commander 5 need nor be connected to the receiver 4 with the cable 6. Instead, radio communication may be established between the receiver 4 and the commander 5. In this case, the commander 5 generates a signal (registration signal) to be transmitted to the receiver 4 based on the response signal received from the transmitter 3, and wirelessly transmits the registration signal to the receiver 4. The registration signal includes the ID code in the response signal. When receiving the registration signal from the commander 5, the receiver 4 stores the ID code in the registration signal in the ID memory 16. The commander 5 transmits or receives all signal with a single antenna 19. Instead, the commander 5 may be provided with a send-only antenna and a receive-only antenna. The commander 5 may also be provided with an antenna for communication with the transmitters 3 and an antenna for communication with the receiver 4. On the other hand, the receiver 4 receives the registration signal from the commander 5 via the reception antenna 14, or an antenna (not shown) separately arranged from the antenna 14. According to this modification, the terminals 22, 17 are omitted from the commander 5 and the receiver 4.

In the above embodiments, the response signals from the transmitters 3 have the same structure as those of the transmission signals according to the periodical transmission mode or the abnormality transmission mode. Instead, each type of signal transmitted from the transmitter 3 may have different structures. Further, information that indicates the type of the signal may be included in the signal sent from the transmitter 3. In this case, when receiving a signal from the transmitter 3, the receiver 4 and the commander 5 accurately determine the type of the received signal. Therefore, the process according to the type of the received signal is accurately performed.

Therefore, the present examples and embodiments are to be considered as illustrative and not restrictive and the invention is not to be limited to the details given herein, but may be modified within the scope and equivalence of the appended claims.

What is claimed is:

1. An apparatus for monitoring the condition of a tire mounted to a vehicle, the apparatus comprising:

a commander, wherein the commander includes an operation switch, and wherein the commander transmits an operation switch, and wherein the commander transmits an instruction signal when the operation switch is turned-on;

a transmitter attached to the tire, wherein the transmitter includes a tire condition sensor, which detects the condition of the tire, a receiving portion, which receives the instruction signal, and a transmitting portion, which transmits a response signal upon receiving the instruction signal, the response signal including a specific identification data given to the transmitter in advance; and a receiver located in the body of the vehicle, wherein the receiver includes a receiving portion, which receives a signal transmitted from the transmitter, and a rewritable ID memory, which stores the identification data of the transmitter, wherein, when the operation switch is turned-on, the commander conveys the turned-on state of the operation switch to the receiver, and wherein, when receiving the response signal while the commander is conveying the turned-on state of the operation switch to the receiver, the receiver stores the identification data in the response signal in the ID memory, wherein the transmitter has a first transmission mode, in which the response signal is transmitted in response to the instruction signal from the commander, and a second transmission mode, in which a signal is transmitted regardless of the instruction signal from the commander, and wherein the signal transmitted according to the second transmission mode includes at least data indicating the condition of the tire detected by the tire condition sensor and the identification data, wherein the receiver has a first operation mode, which permits registration of the identification data, and a second operation mode, which does not permit registration of the identification data, wherein, when the commander is conveying the turned-on state of the operation switch to the receiver, the receiver is operated in the first operation mode, and wherein, when the identification data in a received signal from the transmitter matches with the identification data in the ID memory while the receiver is in the second operation mode, the receiver continues processing the received signal.

2. The apparatus according to claim 1, wherein the receiver is selectively connected to the commander with a cable, and wherein the commander sends an ON signal indicating the turned-on state of the operation switch to the receiver via the cable.

3. The apparatus according to claim 1, wherein the commander is portable.

4. An apparatus for monitoring the condition of a tire mounted to a vehicle, the apparatus comprising:

a commander, wherein the commander includes an operation switch, and wherein the commander transmits an instruction signal when the operation switch is turned-on;

a transmitter attached to the tire, wherein the transmitter includes a tire condition sensor, which detects the condition of the tire, a receiving portion, which receives the instruction signal, and a transmitting portion, which transmits a response signal upon receiving the instruction signal, the response signal including a specific identification data given to the transmitter in advance; and a receiver located in the body of the vehicle, wherein the receiver includes a receiving portion, which receives a signal transmitted from the transmitter, and a rewritable ID memory, which stores the identification data of the transmitter, wherein the commander includes a receiving portion, which receives the response signal from the transmitter, wherein, when receiving the response signal, the commander sends the identification data in the response signal to the receiver, and wherein, when receiving the identification data sent from the commander, the receiver stores the identification data in the ID memory, wherein the transmitter has a first transmission mode, in which the response signal is transmitted in response to the instruction signal from the commander, and a second transmission mode, in which a signal is transmitted regardless of the instruction signal from the commander, and wherein the signal transmitted according to the second transmission mode includes at least data indicating the condition of the tire detected by the tire condition sensor and the identification data, wherein the receiver has a monitoring mode for monitoring the tire condition, wherein, when receiving a signal from the transmitter while the receiver is in the monitoring mode, the receiver continues processing the received signal if the identification data in the received signal matches with the identification data in the ID memory, and wherein, when receiving the identification data sent from the commander while the receiver is in the monitoring mode, the receiver stores the identification data in the ID memory.

5. The apparatus according to claim 4, wherein the receiver is selectively connected to the commander with a cable, and wherein, when receiving the response signal from the transmitter, the commander transfers the identification data in the response signal to the receiver via the cable.

6. The apparatus according to claim 4, wherein the commander is portable.

* * * * *